Dec. 24, 1940.   R. R. R. SARAZIN   2,225,929
VIBRATION DAMPER
Filed Feb. 28, 1938   2 Sheets-Sheet 1
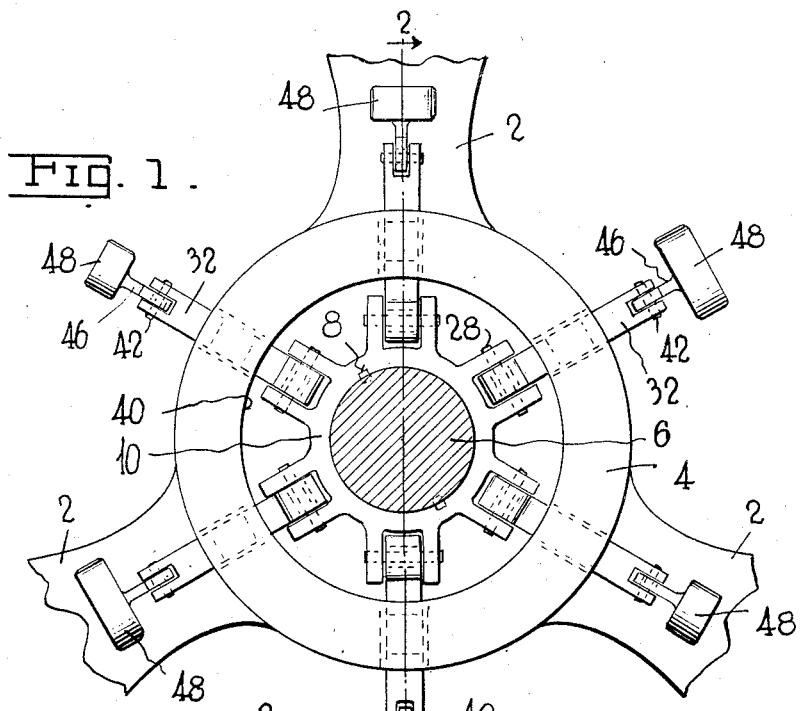
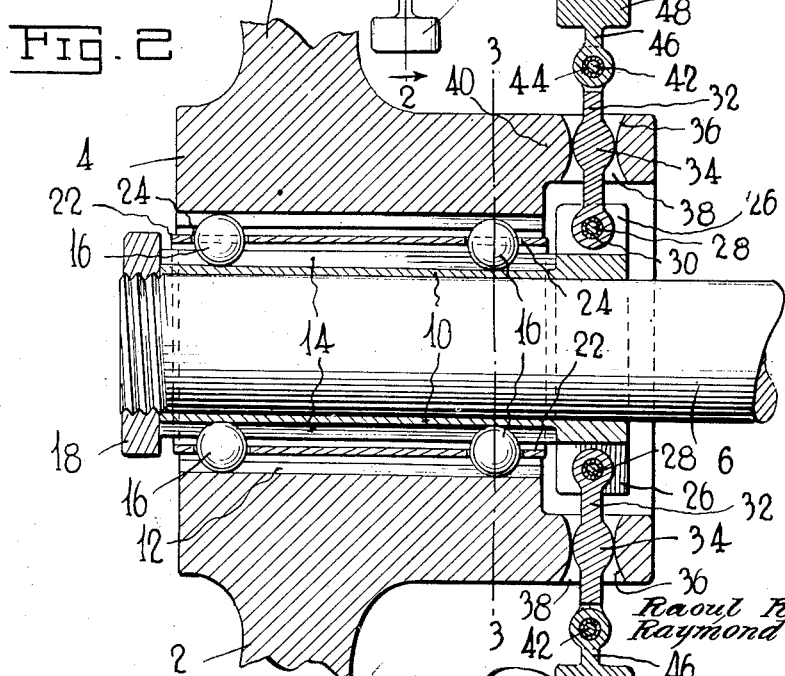
Inventor
Raoul Roland
Raymond Sarazin

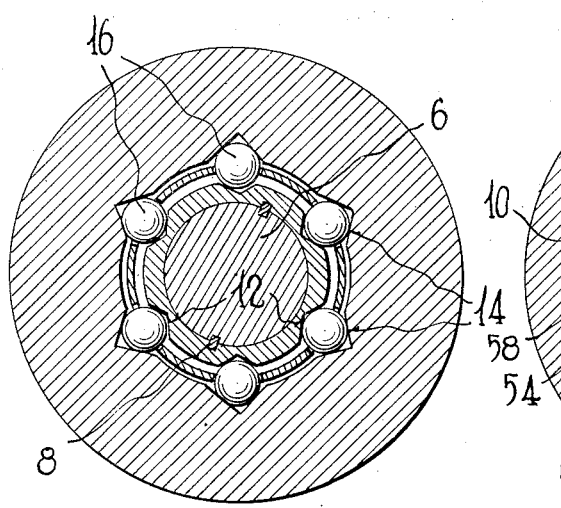
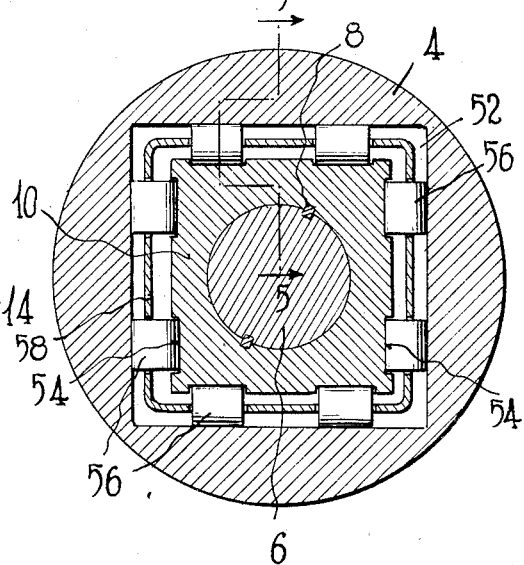
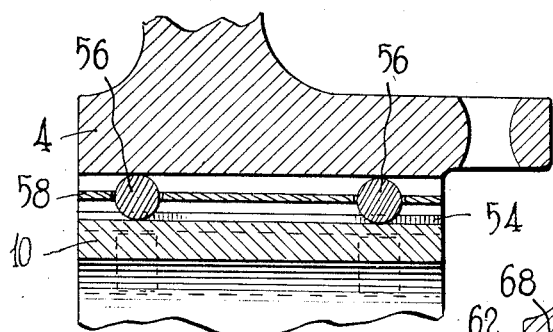
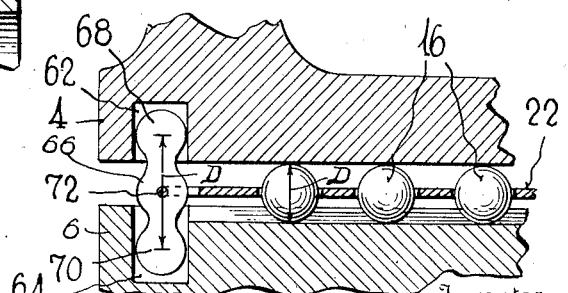

Patented Dec. 24, 1940

2,225,929

UNITED STATES PATENT OFFICE 2,225,929

VIBRATION DAMPER

Raoul Roland Raymond Sarazin, Saint-Prix, France

Application February 28, 1938, Serial No. 193,187

11 Claims. (Cl. 170—177)

My invention relates to vibration dampers for propellers, and, particularly, to such devices for use in combination with aircraft propellers.

In the past, vibrations of aircraft propeller blades have caused many difficulties. These vibrations, in addition to the unpleasant noise which they create, have subjected the blades themselves and the shafts on which they are mounted to constantly varying stresses, which reduce the life of the various parts, and are likely to cause the blades or shaft to break at any time, which results of course in the stalling of the aircraft.

The primary object of the present invention is to provide an arrangement which will prevent the vibrations of propellers, and particularly, of aircraft propellers, from causing fatigue stresses in the propeller blades and their mounting.

A further object is to provide an arrangement of this type which is simple, is formed of few parts, and yet is effective.

A further object is to provide an arrangement which is effective on the propeller at all speeds thereof, but is particularly effective at the speed of greatest vibration, or the critical speed.

Still another object of the invention is to provide a device of this type, utilizing a pendulum or pendulum-like damping means which has a vibration frequency which varies with the speed of the propeller.

The invention comprises primarily a propeller mounted in such a manner that it can move axially with respect to its drive shaft or support and a pendularly mounted mass subjected to centrifugal force which is so connected to the propeller as to vibrate therewith, to take up the vibration forces exerted on the blades and to damp the vibrations thereof.

Further objects and advantages of the invention will appear more fully from the following description, particularly when taken in combination with the drawings:

In the drawings:

Fig. 1 is a rear view of a propeller and vibration damper therefor embodying my invention.

Fig. 2 is a cross-section taken on the line 2—2 of Fig. 1.

Fig. 3 is a cross-section taken on the line 3—3 of Fig. 2.

Fig. 4 is a cross-section similar to Fig. 2 of a modified form of the invention.

Fig. 5 is a partial cross-section on the line 5—5 of Fig. 4.

Fig. 6 is a cross-section of a portion of a modified form of the invention.

In the device shown in Figs. 1 to 3, 2 represents the blades of a propeller, which are in the form shown rigid with the annular hub 4. The propeller is mounted in a manner to be described below on a drive shaft 6.

Keyed as at 8 on the drive shaft 6 is a sleeve 10 forming with the drive shaft a shaft member. This sleeve is provided with one or more V-shaped grooves 12 running longitudinally thereof, or parallel to the axis of the shaft 6. In the inner face of the hub 4 are similar V-shaped grooves 14, equal in number to the grooves 12, and within the grooves 12 and 14 are arranged balls 16. It is evident that such balls will transmit force from the shaft 6 and sleeve 10 to hub 4, while permitting the hub to move with respect to the sleeve in a direction parallel to the axis of the shaft 6.

At the forward end, the grooves 12 are closed by a ring 18 threaded or otherwise secured on the forward end of the sleeve 6. At the rear end, the grooves are closed by a raised portion 20 of the sleeve. The balls 16 are preferably held in spaced position by a cylinder 22 which extends around the sleeve 10 between the sleeve and the hub 4, and which is provided with openings 24 in which are located the balls 16.

Spaced ears 26 are provided at various points upstanding from the raised portion 20 of the sleeve 10. Pivoted in these ears by pins 28 and roller bearings 30 are levers 32. These levers have as at 34 bulging portions with curved surfaces which are in rolling and sliding engagement with surfaces 36 of an aperture 38 provided in a rearward extension 40 of hub 4, so as to provide a sliding fulcrum connection between the lever and hub. This construction causes lever 32 to turn as hub 4 moves backward or forward.

Pivoted on a pin 42 and roller bearing 44 at the free end of lever 32 is an arm 46, the end of which is enlarged to form a weight or mass 48.

The operation of the device above described is as follows:

When the propeller begins to turn, its blades of course pull forwardly, and therefore tend to move the hub 4 forwardly with respect to the sleeve 10. At the same time, the masses 48, which are set in rotation with the propeller, exert a large centrifugal force which tends to hold the lever 32 at right angles to the axis of the shaft 6. This force resists the forward movement of the hub 4, and the hub will move until the two forces are in equilibrium, with the lever 32 forming a variable angle with the axis of shaft 6 dependent on the speed of the propeller, the shape of the blades, the density of the air and other factors. The center of gravity of mass 48 will remain in a line passing through axis 42 and perpendicular to the axis of shaft 6 when equilibrium is reached.

The most important vibrations of a propeller blade are those which tend to bend the blade in a direction parallel to the axis of the shaft, or in other words, forces which act in a plane in which the axis of the shaft lies. Any such vibration will tend to move the hub 4 of the propeller, and therefore to swing the lever 32. The mass 48 will be set in vibration by such a movement of the hub, and its axis 42 will vibrate at the same frequency as the hub, so that the blades will not be subjected to bending stresses. This will exert a damping force on the movement of hub 4 and therefore will damp the vibration of the blade.

In any event, however, the device should be arranged in such a manner that, at least substantially:

$$\frac{r}{R} \times \left(\frac{F_1}{F}\right)^2 = 1$$

where $r$ is the radius of oscillation of the center of gravity of mass 48 about axis 42, $R$ is the distance at any time, depending upon the inclination of the levers, between the center of gravity of mass 48 and the axis of shaft 6, $F_1$ is the vibration frequency of the blade at the critical angular speed of vibration thereof, and $F$ is the frequency of rotation of the shaft at such critical speed. The pendulum composed of lever 46 and mass 48 should be so devised that at the critical angular speed of the shaft of vibration frequency $F$ its frequency will be equal to the frequency of vibration $F_1$ of the blade.

As shown in Fig. 1, the invention is not limited to the use of a single mass, but a plurality of these may be provided, preferably angularly spaced around the axis of the shaft. For example, two opposed masses may have the desired vibration frequency indicated above, while the other two pairs may be arranged to have vibration frequencies respectively higher and lower so as to damp vibrations of a frequency other than that of the vibrations occurring at the critical speed more effectively.

Furthermore, while I have disclosed an ordinary pendular mounting for the mass 48, the same might be mounted on the end of the lever 32 in any other manner which will produce pendular oscillations thereof, for example, in the manner shown in Figs. 1 to 5 of my Patent No. 2,137,591, in which devices which will oscillate in the manner of a simple or pure pendulum are disclosed.

In the form of the invention shown in Figs. 4 and 5, a modified arrangement for connecting the hub 4 and sleeve 10 is disclosed. In this arrangement, there is provided a square opening 52 in the hub 4, while the sleeve 10 is given a generally square shape of somewhat smaller dimensions. In the outer faces of the sleeve 10 are arranged tracks or grooves 54 extending longitudinally thereof, these tracks having flat bottoms. Rollers 56 are mounted in the grooves, and these rollers also engage the inner surfaces of the aperture 52. A spacing member 58 is provided for the rollers 56. These rollers will transmit torsional force from the sleeve 10 to the hub 4, so as to drive the hub therefrom.

Fig. 6 shows an arrangement similar to that of Figs. 1 to 3, being further provided with a means for insuring the proper positioning of the balls 16 when the hub moves with respect to the sleeve and shaft. Plate 22 is utilized for this purpose. Within the opposed faces of the hub 4 and the shaft 6 are arranged recesses 62 and 64, respectively, and a lever 66 is provided with heads 68 and 70 engaging in these recesses. At 72 plate 22 is pivoted to the central part of lever 66. It is evident that as hub 4 shifts it will move plate 22 with it and thus move the balls 16 so that they will always be properly positioned between the hub and the sleeve.

Preferably the diameter $d$ of the balls 16 is half the distance $D$ between the effective fulcrums of the lever 66 in recesses 62 and 64.

While I have described herein some embodiments of my invention, it is obvious that many changes may be made within the scope thereof and I therefore wish it to be understood that I do not intend to be limited by the description except within the scope of the claims.

I claim:

1. In a device for damping the vibrations of a propeller, a shaft, a propeller mounted on said shaft for rotation therewith and for movement axially of the shaft, a member pivotally mounted on said shaft and rotatable therewith, means operatively connecting said member to said propeller constructed and arranged to transmit axial movement of said propeller to said member, and pendular means pivoted on said member to damp vibrations thereof.

2. In a device for damping the vibrations of a propeller, a shaft, a propeller mounted on said shaft for rotation therewith and for movement axially of the shaft, a member pivoted to said shaft to move in a plane parallel to the axis of the shaft and rotatable therewith, means operatively connecting said member to said propeller constructed and arranged to transmit axial movement of said propeller to said member, and pendular means pivoted on said member to move in a plane parallel to the axis of the shaft to damp vibrations of said member.

3. In a device for damping vibrations of a propeller, a shaft member having tracks therein extending parallel to the axis of the shaft, a propeller around said shaft, tracks in said propeller parallel to the tracks in said shaft member, rotatable members in said tracks for operatively connecting said propeller to said shaft member for rotation with the shaft, a member pivoted to and rotatable with said shaft, means operatively connecting said member to said propeller to transmit axial movement of said propeller to said member, and pendular means rotatable with said shaft and pivoted on said member for damping vibrations thereof.

4. In a device for damping vibrations of a propeller, a shaft member having tracks therein extending parallel to the axis of the shaft, a propeller having a hub around said shaft, tracks in said hub parallel to the tracks in said shaft member, rotatable members in said tracks for operatively connecting said hub to said shaft member for rotation with the shaft, said hub having an aperture therein, a lever pivoted on said shaft and extending through said aperture, an arm pivoted on said lever and a mass carried by said arm.

5. In a device for damping vibrations of a propeller, a shaft member having tracks therein extending parallel to the axis of the shaft, a propeller having a hub around said shaft, tracks in said hub parallel to the tracks in said shaft member, rotatable members in said tracks for operatively connecting said hub to said shaft member for rotation with the shaft, a lever pivoted on said shaft member, a sliding fulcrum connection between said lever and sleeve, an arm pivoted on said lever, and a mass carried by said arm.

6. In a device for damping vibrations of a propeller, a shaft, a sleeve on said shaft, said sleeve having tracks therein extending parallel to the axis of the shaft, a propeller having a hub around said sleeve, tracks in said hub parallel to the tracks in said sleeve, rotatable members in said tracks for operatively connecting said hub to said sleeve for rotation therewith, said hub having an aperture therein extending perpendicular to the axis of the shaft, a lever pivoted on said sleeve and extending through said aperture, an arm pivoted on said lever and a mass carried by said arm.

7. In a device as claimed in claim 3, means extending around said sleeve for holding said rotatable members in spaced relation.

8. In a device as claimed in claim 6, a plate having apertures therein in which said rotatable members are located, and means operated by relative movement between said hub and sleeve to move said plate.

9. In combination, a shaft, a propeller mounted on said shaft for rotation therewith and for movement axially of the shaft, weight means mounted with the propeller and shaft to move between a position furthest from the axis of the shaft and positions on either side of such mean position closer to the axis, means operatively connecting said weight means to the shaft for rotation therewith, means tending to hold said propeller in a predetermined axial position on said shaft while permitting a slight axial movement thereof, and means to transmit to said weight means vibration forces tending to cause axial movement of said propeller.

10. In combination, a shaft, a propeller mounted on said shaft for rotation therewith and for movement axially of the shaft, pendulum means pivotally connected to the shaft to swing between a mean position furthest from the axis of the shaft and positions on either side of such mean position closer to the axis, means connecting said pendulum means to the shaft for rotation therewith, and means operatively connecting said propeller to said pendulum means to transmit to such pendulum means vibration forces tending to cause axial movement of the propeller, said last means tending to hold said propeller in a predetermined axial position on said shaft while permitting a slight axial movement thereof.

11. In combination, a unit comprising a shaft and a propeller mounted on said shaft to rotate therewith and for movement axially of the shaft, means tending to hold said propeller in a predetermined axial position on said shaft while permitting a slight axial movement thereof, and pendulum means operatively connected to said unit to rotate therewith and to oscillate in the field of centrifugal force created by the rotation of said unit in response to vibrations of said propeller in a direction parallel to the axis of the shaft.

RAOUL ROLAND RAYMOND SARAZIN.